Jan. 29, 1957
J. MOON
2,779,915
BOREHOLE ELECTRODES
Filed Jan. 8, 1952
3 Sheets-Sheet 1
Fig. 1.
Fig. 3.
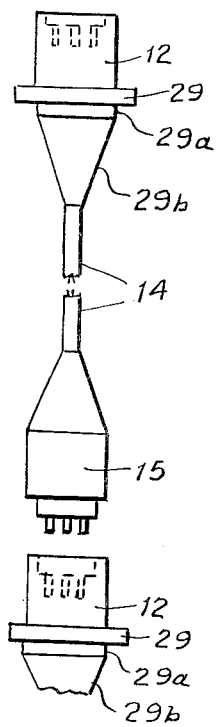
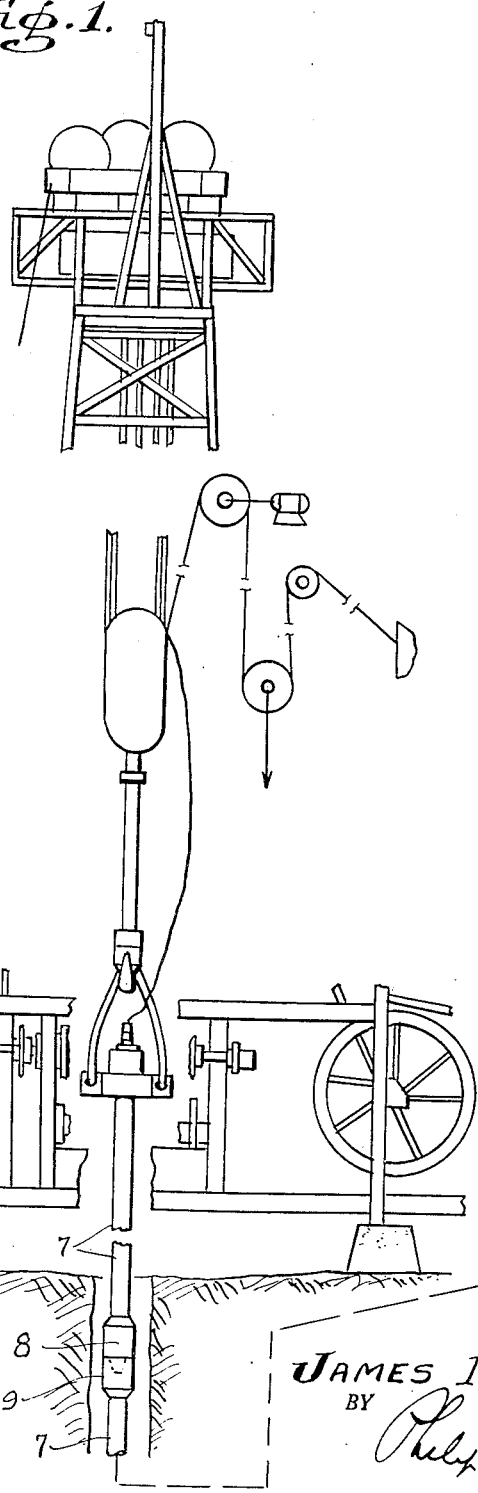
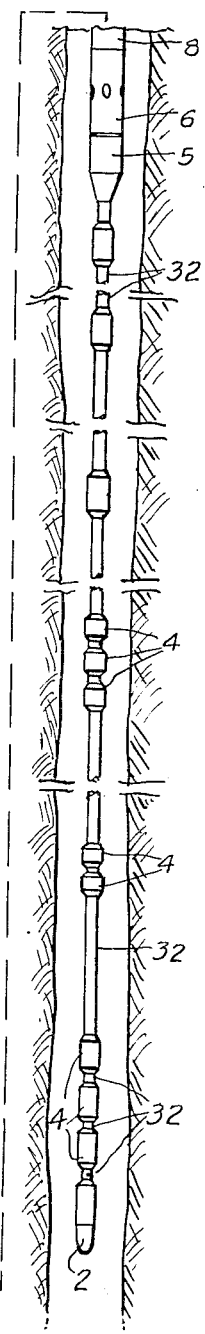
INVENTOR.
JAMES MOON
BY
ATTORNEY.

Jan. 29, 1957 J. MOON 2,779,915
BOREHOLE ELECTRODES
Filed Jan. 8, 1952 3 Sheets-Sheet 2
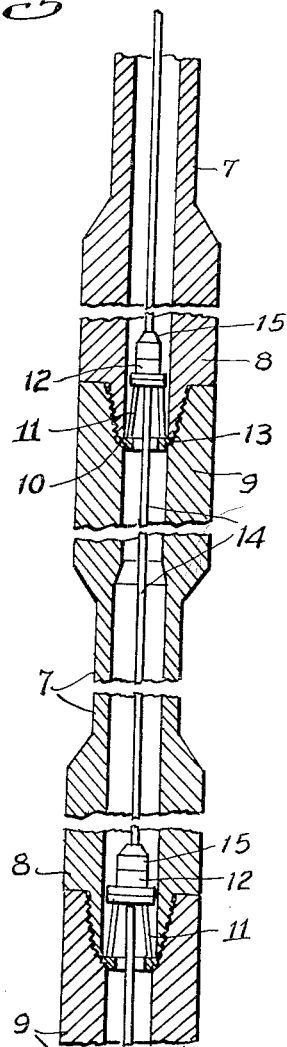
Fig. 2.
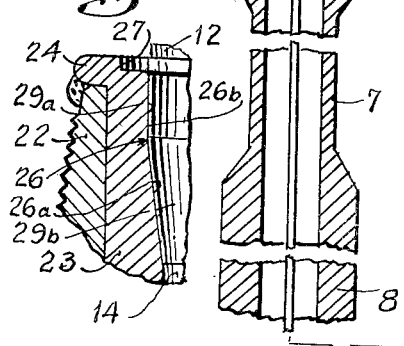
Fig. 10.
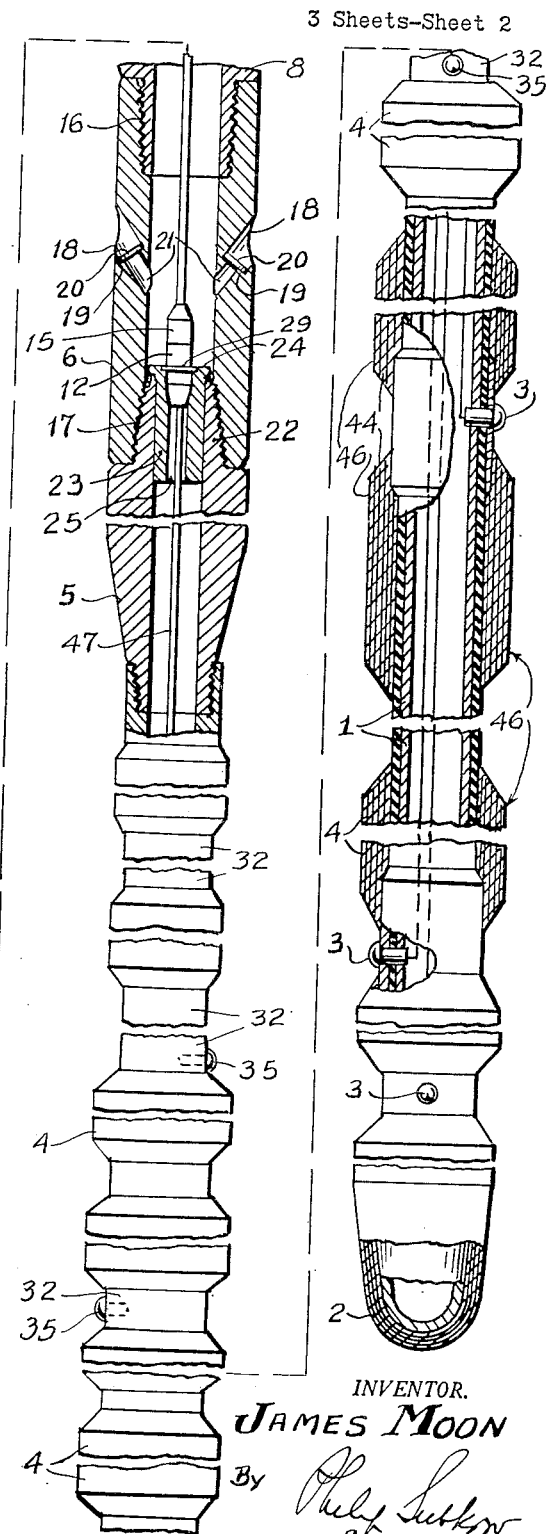
INVENTOR.
JAMES MOON
By
ATTORNEY.

Jan. 29, 1957   J. MOON   2,779,915
BOREHOLE ELECTRODES
Filed Jan. 8, 1952   3 Sheets-Sheet 3
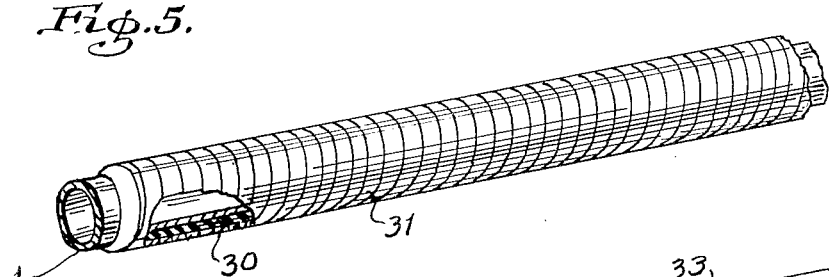
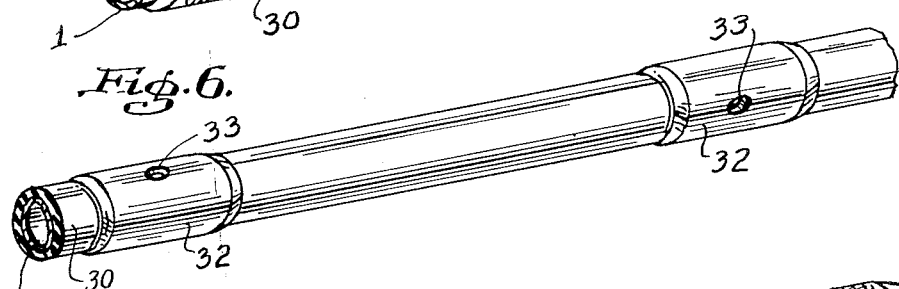
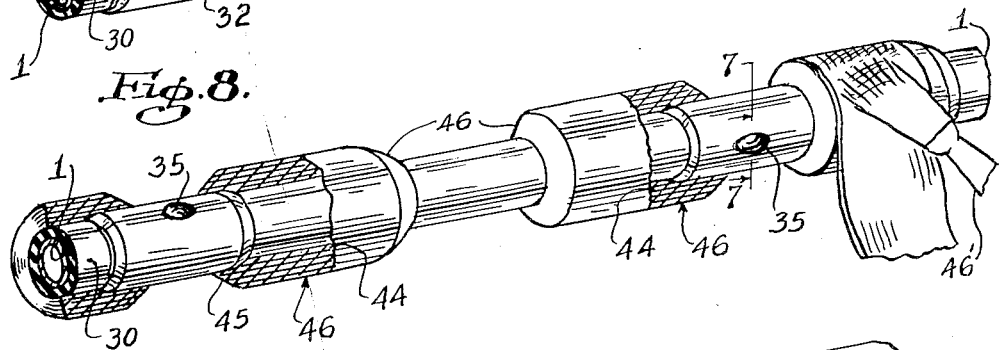
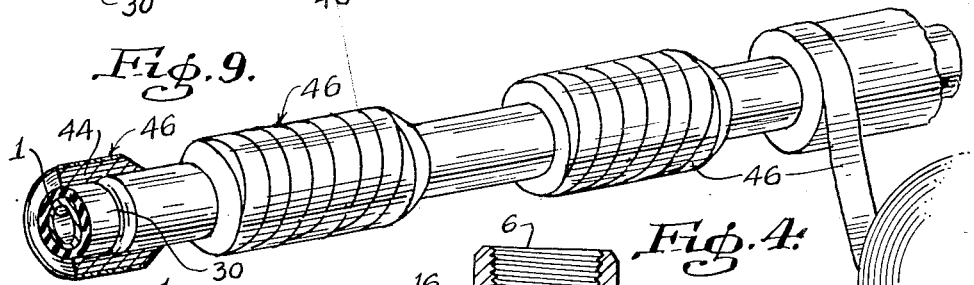
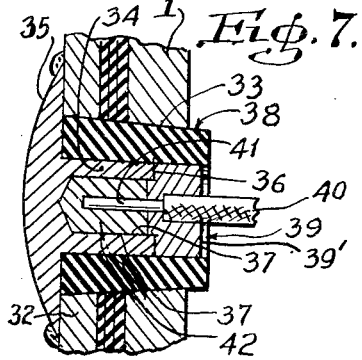
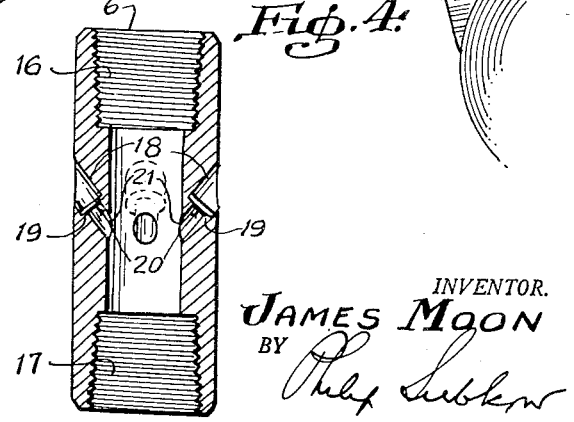
INVENTOR.
JAMES MOON
BY
ATTORNEY.

United States Patent Office 2,779,915
Patented Jan. 29, 1957

2,779,915

BOREHOLE ELECTRODES

James Moon, Corona Del Mar, Calif., assignor to Signal Oil and Gas Company, Los Angeles, Calif., a corporation of Delaware Application January 8, 1952, Serial No. 265,459

5 Claims. (Cl. 324—10)

This invention relates to a device for electrologging of bore holes. The technique of introducing electrodes into a bore hole to determine its resistance or capacitance of formations or for like purposes is well known and established in oil field practice. These operations consist essentially of lowering one or more electrodes into a bore hole and measuring the electrical characteristics of the formation adjacent the electrodes.

It has been the practice to lower such electrodes at the end of a conductor cable. While this practice is permissible in vertical holes, it becomes impractical in deviated or slanting holes, i. e., those of which the axes are not vertical. If the angle of the hole is sufficiently flat, i. e., close to horizontal, the cable lies on the low side of the hole and will not slide down the bore hole.

I have devised an electrode construction which may be lowered at the end of a pipe and thus may be pushed into both vertical, slant, and even horizontal bores. Provision is made to enclose the cable inside the pipe and to insulate the electrodes so as to isolate the electrodes from all parts of the structure except the electrical conduits.

In order to avoid current leaks between the electrodes over the surface of the metallic pipe, the pipe section between the electrodes carries an insulating cover so as to insulate the electrodes from the pipe and from each other. The insulating cover is protected from wear by positioning wear or abrasion rings periodically along the length of the electrode pipe.

Provision is made to seal the electrode pipe against intrusion of liquid from the bore hole. However, if desired, means may be provided for circulating fluid from the surface through the lowering pipe and also for keeping the interior of the electrode pipe dry.

These and other objects of the invention will be understood from the following description taken together with the drawings, in which Fig. 1 is an assembly showing the positioning of the electrode of my invention for use in an oil well;

Fig. 2 is a view in part vertical section through the electrode and the pipe used for lowering the electrode;

Fig. 3 is a detail of a cable useful in connection with my electrode;

Fig. 4 is a vertical section of the circulation sub useful in connection with my invention;

Fig. 5 is a fragmentary perspective view of the electrode in an early stage of construction;

Fig. 6 is a fragmentary perspective view of the electrode in a later stage of the manufacture;

Fig. 7 is a section taken on line 7—7 of Fig. 8;

Fig. 8 is a fragmentary perspective view of the electrode in a later stage of construction;

Fig. 9 is a fragmentary perspective view of the electrode in a later stage of manufacture; and Fig. 10 is a detail sectional view of the double-pin adapter sub.

The electrode is composed of a wrapped pipe 1, closed by a bull plug 2, carrying exposed electrode buttons 3, and carrying wear build-ups 4. The electrode is connected to pin adapter or connector 5 and through a circulation member 6 to the drill pipe or other type of lowering pipe, here illustrated as made up of a plurality of stands 7 connected by box and pin type couplings, such as a standard tool joint made up of pins 8 and box 9 at each end of each stand 7. Positioned in the shoulder 10 at the end of the internal thread of each box 9 is a spider 11 which carries the female plug 12 of a push-pull type of electrical connector. The pin end abuts the lower ring 13 of the spider 11 to clamp it in position. The cable 14 is threaded through the stand 7 and is connected to the female plug 12 and to a male plug 15. Commercial prongs and sockets of this type are available on the market. The cable section 14 is sufficiently long so that when the stand 7 is disconnected from the string and the female plug 12 positioned in the spider 11, the male plug 15 hangs below the pin at the other end of the stand. Thus the stands are made up by inserting the male plug into the female plug of the next lower stand and screwing the pin into the box, the slack of the cable being inserted into the upper stand, thus permitting the joint to be screwed tightly without twisting the cable.

No claim is made for the construction of the joint and the cable connections or the means of mounting the cable in the stands, the same being the subject of a co-pending application Serial No. 265,424, filed January 8, 1952, of Daniel S. Johnston, now Patent No. 2,748,358.

At the end of the string of pipe, upon the lowermost pin, I may mount the circulation sub 6 having ends carrying internal threads 16 and 17 and angularly positioned ports 18 carrying frictionally held disks 20 seated upon a shoulder 19. This provides an inner port 21 concentric with ports 18 but of smaller diameter. The cable 14 in the last stand, i. e., the stand screwed into threads 16, is lengthened so that the male plug will hang below the threads 17. It may then be inserted into the next lower female plug positioned in the connector 5, the slack being inserted into the circulation sub 6.

Connecting the circulation member or pipe 6 with the electrode is the double pin connector 5. In the end of the upper pin 22 is positioned a plug 23 formed with an end flange 24 which may be seated on the end of pin 22 and welded in position. The plug has a central bore 25 disposed axially so as to be in axial alignment with the bore of pipe 1. A frusto-conical seat 26 and a cylindrical counterbore 27 are provided into which the frusto-conical female plug may be sealed with a tight fit, its flange 29 being positioned in and sealing the counterbore 27, and the conical portion 29b of the female plug making a friction fit with the conical portion 26a of the seat 26, and the cylindrical portion 29a of the female plug making a like fit with the cylindrical portion 26b of the seat 26. The flange and frusto-conical plug thus makes a fluid-tight seal of the bore 25, preventing leakage of fluid from the circulation sub or the bore hole into the interior of the electrode.

The electrode is formed as follows: A steel pipe 1 is cleaned by pickling and sandblasting and is welded to the bull plug 2 to close its end. Glass fiber cloth 30 is impregnated with a resin such as, for example, a low pressure contact resin carrying a photopolymerization catalyst. Examples of such resins and catalysts are well known in the prior art, and need no further elucidation here. In order to apply sufficient pressure, the glass fiber cloth 30, after it is wound tightly on the pipe, is wound with cellophane tape carrying a contact adhesive with a spiral winding 31. As an example of the sizes involved, a 50-foot pipe, in sections, if desired, and joined by couplings, is wound so that the total exterior surface of the pipe, including the bull plug, is covered by the fiber glass and the cellophane tape. The wound pipe may be cured. Using the above resins, the cure may be obtained by exposure to sunlight. After the cure has been completed, the cellophane tape is removed and the fiber glass surface of the pipe is sanded smooth.

At spaced intervals near the lower end of the electrode, metallic bands 32 are sprayed onto the surface of the cured glass fiber. This may be accomplished by the now conventional technique of spraying molten metal used commercially for coating of surfaces with metal. A suitable metal for the purpose of the electrode is zinc or some other metal not corrosible by oil field waters and muds encountered in oil wells.

I spray a number of bands equal to the number of electrodes. In the illustrated case the number is 6. After the metal bands are sprayed on, they are cleaned with soldering salts such as used with ordinary solder and the surface of the metal band is "tinned" by coating the band with ordinary solder. This is necessary in order to seal the sprayed zinc which is porous.

The bands 32 and the pipe 1 are drilled and taper reamed at 33 and the hole cleaned of chips. The conductor plugs 34 are provided, carrying a head 35 and a shank 36. The shank is bored part way to give a bore 37. A conical sleeve 38 made of neoprene or other oil resistant rubber is cemented to shank 36 with the end of the sleeve abutting the head 35. The shank extends part way into the sleeve 38 to give a chamber 39.

The conductor wire 40 is stripped part way to reveal the metal wire 41. The wire is inserted into the bore 37 with the insulated portion in the chamber 39. Silver solder 42 is placed in the bore 37 to connect the wire to the plug 34. The chamber 39 and the unfilled portion of the bore 37 are filled with a rubber or other type of non-conductive cement 39'. The insulated conductor 40 is then threaded through the bore 33 and the sleeve 38 drawn into the hole until the head 35 of the plug 34 is against the band 32, with the sleeve projecting inside the steel pipe 1. The sleeve makes a friction fit in the bore. The periphery of the head 35 is soldered to the metallic band 32.

A trapezoidal strip of resin coated glass fiber cloth is wound on each side of the metallic band 32 so that the cloth overlaps the edges. As the cloth is wound it builds up a layer of resin coated glass fiber cloth. This is conveniently done by painting the glass fiber cloth with the resin as the cloth is wound, as is illustrated in Fig. 8, by brush 46'. The cloth is tightly wrapped. As the layers build up, the trapezoidal character of the cloth builds up a ring 44 having beveled ends 45. This ring overlaps the metallic band at both ends and is resin bonded to the metal and the underlying glass fiber 30. The build-up ring 44 is wrapped tightly with clear cellophane tape 46 and sun cured.

The six wires inside the electrode are threaded through the pipe and connected to the cable 47 connected to the plug 23 which is positioned inside the seat 26 in sub 5.

The construction of the electrode as described herein has many advantages. The resin bonded glass fiber coating to the steel pipe electrically insulates the exterior surface of the pipe and gives an exterior surface which has a large electrical resistance and a high dielectric value. Surface leakage of current between the metallic bands is reduced to a minimum. This is of primary importance. For like reason leakage from the electrode bands to the steel pipe stands 7 is also reduced since the pipe 1 along its entire length, clear up to the connector 5, is covered in the manner described.

While I may use any other insulating coating of high dielectric value such as, for example, rubber or, better still, artificial oil resistant rubber, such as neoprene tape, or employ a rubber coated pipe with the rubber sheathe vulcanized to the pipe, I have found that the resin impregnated glass fiber cloth is particularly useful since it may be simply applied, as described above, and has good abrasion resistance when so applied and is inert to oil, mud and oil field and bore hole waters at the high temperatures and pressures encountered in bore holes.

The problem of providing an external metallic electrode of substantial surface necessary for bore hole exploration and connecting the electrode to a conduit positioned in the interior of the pipe is aggravated by the necessity of providing a bore in the pipe through which the conduit passes and sealing the bore against the extraordinarily high hydrostatic pressure in the bore hole.

By using a molten metallic spray, the metal may be deposited in intimate contact with the glass fiber coating and thus make an intimate fluidtight seal with the glass fiber which extends over the whole area of contact between the sprayed metallic bands and the glass fiber.

In order to increase the impermeability of the metal, which when laid down in this manner is porous, it is coated with a layer of metal such as solder, thus creating a smooth, impermeable band of metal intimately and impermeably bonded over the entire surface of contact of the metal band to the glass fiber coating of the pipe 1. Experience has shown that while this manner of bonding the metallic ring to the exterior of the pipe withstands the high hydrostatic pressures in the oil well, other procedures of cementing or clamping metallic bands of sheet metal or other metal rings do not withstand the pressures in the well and leakages between the band and the glass fiber were encountered in such other procedures.

The build-up ring 44 overlapping the edges of the metallic bands also protects the edges of the bands against leakage and assists in making the joint fluidtight. By positioning such insulating wear resistant bands on each side of the metallic bands, the bands are recessed in annular recesses between the build-ups, which have a substantially greater external diameter than the metallic bands, thus preventing short circuiting between the metallic bands as the electrode is laid in contact with a continuous metallic surface, as when it is lowered inside an oil well pipe or casing.

Additionally, since these wear rings take the wear off the glass fiber coating 30, they are resin impregnated and remarkably resistant to abrasion. Should they wear, they are easily replaced without disturbing the remaining portion of the glass fiber coating of the electrode.

While I have described a particular embodiment of my invention for the purpose of illustration, it should be understood that various modifications and adaptations thereof may be made within the spirit of the invention as set forth in the appended claims.

I claim:

1. A bore hole electrode comprising a first metallic pipe, a closure sealing one end of said pipe, means for connecting said pipe to a second pipe for lowering of said first mentioned pipe into a bore hole, means forming a fluidtight seal between said first and second pipes, an insulating coating covering the entire outer surface of said first mentioned metallic pipe, a plurality of metallic electrodes in the form of bands positioned on the exterior of said insulating coating for said pipe, said coating being positioned between said electrodes and said first pipe, a second wear resistant insulating coating distributed over said first mentioned insulating coating between said bands and overlapping the edges thereof, said second insulating coating forming a fluidtight joint with the edges of said band, and an electrical conductor passing through said first mentioned pipe and insulating coating and electrically connected to said metallic electrodes.

2. A bore hole electrode comprising a first metallic pipe, a closure sealing one end of said pipe, means for connecting said pipe to a second pipe for lowering of said first pipe into a drill hole, means forming a fluidtight seal between said first and second pipes, an insulating coating for said first mentioned metallic pipe, said coating covering the entire outer surface of said first mentioned pipe, a plurality of metallic bands positioned at spaced intervals on and intimately contacting the exterior of said insulating coating, a bore passing through each of said bands, insulating coating, and first mentioned pipe, a metallic plug passing through each of said bores and insulated from said first pipe and each in electrical contact with a band, an electrical conductor in said first mentioned pipe in electrical contact with said plug, and an insulating wear band positioned on the exterior of the first pipe and overlapping the edges of said metallic bands, the external diameter of said wear bands being materially greater than the said metallic bands.

3. A bore hole electrode comprising a first metallic pipe, a closure sealing one end of said pipe, means for connecting said pipe to a drill pipe for lowering of said first pipe into a drill hole, means forming a fluidtight seal between said pipes, an insulating coating for said first mentioned metallic pipe, a plurality of metallic bands positioned at spaced intervals on and intimately contacting the exterior of said insulating coating, a bore passing through each of said bands, insulating coating, and first mentioned pipe, said coating covering the entire outer surface of said first mentioned pipe, said bore being closed by a conductive plug, said plug having a head and shank, an insulating sleeve mounted on said shank, said shank fitting in said bore with the head in contact with the exterior of the metallic band, an electrical conductor inside said first mentioned pipe and connected to said shank, and an insulating wear band positioned on the exterior of the first pipe and overlapping the edges of said metallic bands, the external diameter of said wear band being materially greater than the said metallic bands.

4. An electrical structure for bore holes comprising a metallic pipe closed at one end, a connector connected to the other end of said pipe, an axial bore in said connector, a frusto-conical seat in said bore in axial alignment with the interior of said pipe, an insulating coating for said pipe over the entire outer surface of said pipe up to said connector, metallic electrode bands positioned in spaced relation to each other on and intimately contacting the exterior of said insulating coating, said coating being positioned between said bands and said pipe, electrical conductors in the interior of said pipe and passing through bores in said pipe and said insulating coating, fluidtight connections between said bands and said conductors, insulation between said conductors and said pipe, a frusto-conical electrical connector plug positioned in said frusto-conical seat and making a fluidtight plug adjacent said other end of said pipe, said electrical conductors being connected through the interior of said pipe to said plug, and an insulating wear band positioned on the exterior of the pipe and overlapping the edges of said metallic bands, said wear band covering only a portion of said metallic bands, the external diameter of said wear band being materially greater than the said metallic bands.

5. A bore hole electrode comprising a metallic pipe, a closure sealing one end of said pipe, means for connecting said pipe to a drill pipe for lowering of said pipe into a drill hole, means forming a fluidtight seal between said pipes, an insulating coating for said first mentioned metallic pipe, said insulating coating comprising a resin bonded winding of glass fiber cloth, a plurality of metallic bands positioned at spaced intervals on the exterior of and intimately contacting said insulating coating, a bore passing through each of said bands, insulating coating, and first mentioned pipe, said bore being closed by a conductive plug, said plug having a head and shank, an insulating sleeve mounted on said shank, said shank fitting in said bore with the head in contact with the exterior of the metallic band, an electrical conductor inside said first mentioned pipe and connected to said shank, and an insulating wear band positioned on the exterior of the pipe and overlapping the edges of said metallic bands, said wear band covering only a portion of said metallic bands, said insulating wear band comprising a resin bonded winding of glass fiber, the external diameter of said wear band being materially greater than the said metallic bands.

References Cited in the file of this patent
UNITED STATES PATENTS

| Number | Name | Date |
|---|---|---|
| 2,228,223 | Bays | Jan. 7, 1941 |
| 2,247,417 | Silverman et al. | July 1, 1941 |
| 2,364,159 | Muffly | Dec. 5, 1944 |
| 2,404,622 | Doan | July 23, 1946 |
| 2,524,031 | Arps | Oct. 3, 1950 |
| 2,581,979 | Standing et al. | Jan. 8, 1952 |
| 2,653,294 | McMillan | Sept. 22, 1953 |